(12) United States Patent
Maruyama et al.

(10) Patent No.: US 9,007,475 B2
(45) Date of Patent: Apr. 14, 2015

(54) COMMUNICATION APPARATUS AND ELECTRONIC MAIL CREATION METHOD

(75) Inventors: Yasunari Maruyama, Tokyo (JP); Yushi Niwa, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 255 days.

(21) Appl. No.: 13/513,737

(22) PCT Filed: Dec. 15, 2010

(86) PCT No.: PCT/JP2010/073062
§ 371 (c)(1),
(2), (4) Date: Jun. 4, 2012

(87) PCT Pub. No.: WO2011/074700
PCT Pub. Date: Jun. 23, 2011

(65) Prior Publication Data
US 2012/0242863 A1   Sep. 27, 2012

(30) Foreign Application Priority Data
Dec. 17, 2009  (JP) ................................ 2009-285886

(51) Int. Cl.
| H04N 5/232 | (2006.01) |
| H04L 12/58 | (2006.01) |
| H04M 1/725 | (2006.01) |
| G06Q 10/10 | (2012.01) |
| H04N 1/21 | (2006.01) |

(52) U.S. Cl.
CPC ........... *H04L 51/10* (2013.01); *H04M 1/72552* (2013.01); *H04M 2250/52* (2013.01); *G06Q 10/10* (2013.01); *H04N 1/2137* (2013.01); *H04N 5/23206* (2013.01)

(58) Field of Classification Search
CPC .................................................. H04N 1/00148
USPC ............................ 348/211.2, 231.3; 382/115
See application file for complete search history.

(56) References Cited

U.S. PATENT DOCUMENTS

| 2003/0117663 A1* | 6/2003 | Oonuma ....................... 358/402 |
| 2004/0156535 A1* | 8/2004 | Goldberg et al. ............. 382/115 |

(Continued)

FOREIGN PATENT DOCUMENTS

| JP | 2004-120542 | 4/2004 |
| JP | 2004-153453 | 5/2004 |

(Continued)

OTHER PUBLICATIONS

International Search Report, PCT/JP2010/073062, Feb. 15, 2011.

(Continued)

*Primary Examiner* — Joel Fosselman

(57) ABSTRACT

Disclosed is a communication device wherein, in order to improve operability when sending electronic mail to which image data has been attached, the communication device is provided with an image capture means for capturing image data of a subject; a storage means for storing registered information associating a predetermined action with a destination address; and a control means that, in response to a predetermined action being performed during operation of the image capture means, controls the image capture means so that the storage means records image data that is being captured by the image capture means, and additionally set a destination address recorded in the registered information associated with the predetermined action as a destination, and creates an electronic mail message to which the recorded image data has been attached.

3 Claims, 8 Drawing Sheets

(56) References Cited

U.S. PATENT DOCUMENTS

| | | |
|---|---|---|
| 2006/0121850 A1 | 6/2006 | Hama |
| 2007/0189746 A1 | 8/2007 | Park |

FOREIGN PATENT DOCUMENTS

| | | |
|---|---|---|
| JP | 2004-289879 | 10/2004 |
| JP | 2005-100191 | 4/2005 |
| JP | 2006-005628 | 1/2006 |
| JP | 2007-048156 | 2/2007 |

OTHER PUBLICATIONS

Extended European search report, dated Oct. 24, 2014, in corresponding European Patent Application No. 10837722.7.

\* cited by examiner

Fig. 9

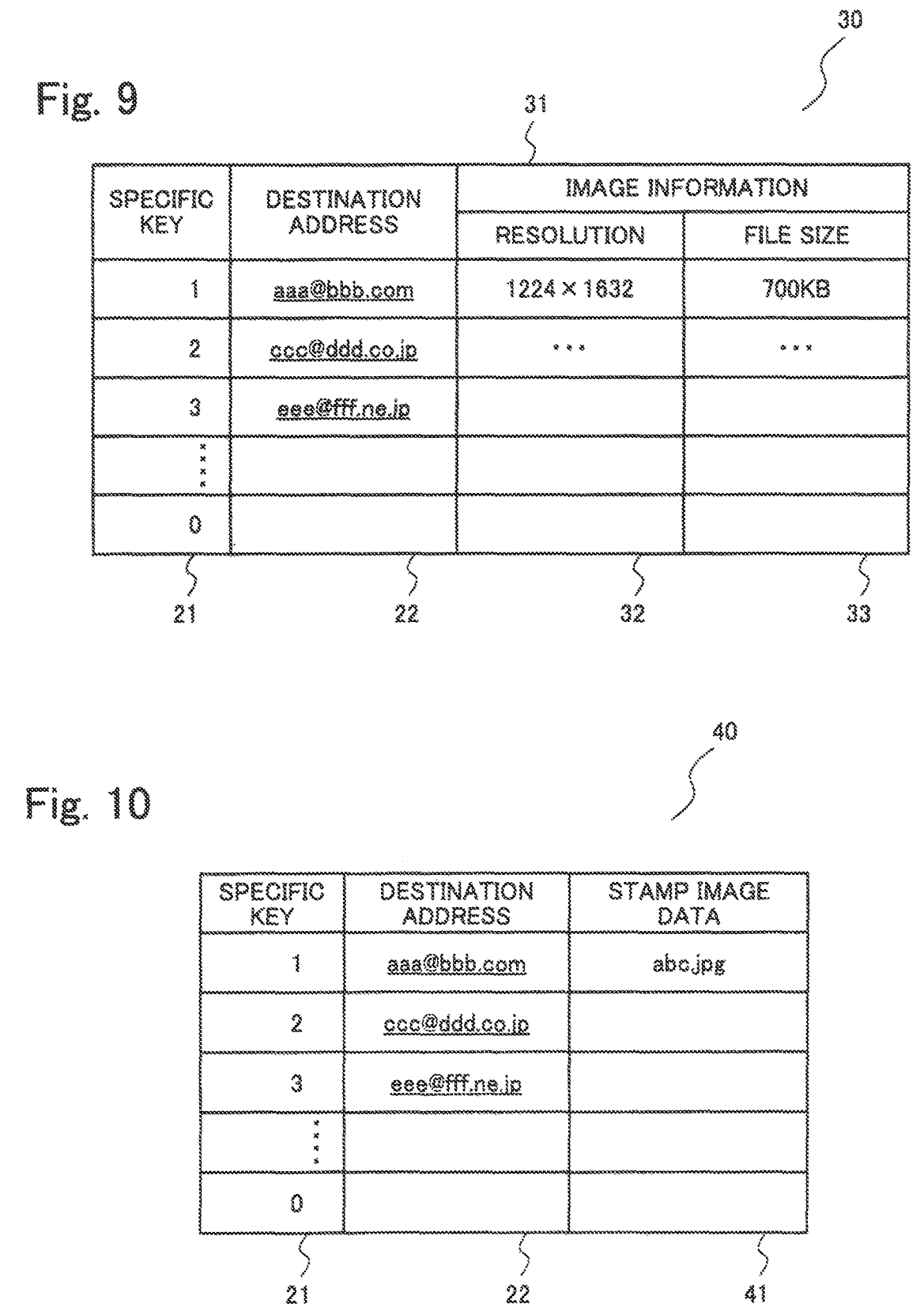

| SPECIFIC KEY | DESTINATION ADDRESS | IMAGE INFORMATION | |
|---|---|---|---|
| | | RESOLUTION | FILE SIZE |
| 1 | aaa@bbb.com | 1224 × 1632 | 700KB |
| 2 | ccc@ddd.co.jp | ... | ... |
| 3 | eee@fff.ne.jp | | |
| ⋮ | | | |
| 0 | | | |

| SPECIFIC KEY | DESTINATION ADDRESS | STAMP IMAGE DATA |
|---|---|---|
| 1 | aaa@bbb.com | abc.jpg |
| 2 | ccc@ddd.co.jp | |
| 3 | eee@fff.ne.jp | |
| ⋮ | | |
| 0 | | |

21　22　41

40

COMMUNICATION APPARATUS AND ELECTRONIC MAIL CREATION METHOD

TECHNICAL FIELD

The present invention relates to a communication apparatus which has achieved an improvement in the ease of operations thereof.

BACKGROUND ART

In recent years, such an operation of photographing an object by using a mobile communication terminal equipped with a camera unit and transmitting an e-mail attached with the image data having been acquired through the photography has been generally performed. This operation is usually performed in accordance with the following procedure.

That is, first, the user starts the camera unit included in the mobile communication terminal. The camera unit scans an object to acquire the image data related thereto, and further, displays the acquired image data on a display unit. The user performs an acquisition by pushing a shutter button thereof with watching the display unit. In response to the shutter button being pushed down, the image data being displayed on the display unit is stored into a memory portion. Next, the user performs an operation of terminating an imaging mode, and further, starts an e-mail function. The user creates a new e-mail, and further, designates the stored image data as an attachment file of the e-mail. Further, the user input a destination address and an e-mail body, and then, the user executes a mail transmission operation.

By performing such operations as described above, the user can acquire the image of the object by using a camera unit, and can transmit the e-mail to which the acquired image data is attached. However, in order to transmit an e-mail with which the image data related to an object is attached, the user needs many operations. Therefore, there is a disadvantage in that the operability is insufficient for users.

For example, Japanese Patent Application Laid-Open No. 2004-153453, Japanese Patent Application Laid-Open No. 2004-289879 and Japanese Patent Application Laid-Open No. 2005-100191 disclose solutions of the above described disadvantage. Japanese Patent Application Laid-Open No. 2004-153453 discloses a folding-type mobile termination apparatus which is configured to, when, in a folded condition, made into an unfolded condition under the state where a selected image is displayed on a display area provided on the back thereof, automatically start an e-mail function. The mobile terminal apparatus displays a screen for creating a new e-mail on the display area, and further, automatically attaches the image data related to the selected image to the e-mail.

Japanese Patent Application Laid-Open No. 2004-289879 discloses a mobile communication terminal which is configured to, when an e-mail transmission operation is performed during an imaging mode in which a still image being acquired by a camera is displayed on a display unit, start an e-mail transmission mode. When, under the state where the e-mail transmission mode is started, the user inputs information necessary for an e-mail transmission, and further, creates a e-mail body, the mobile communication terminal attaches the encoded data corresponding to the still image being displayed on the display unit to the e-mail body, and further, transmits the e-mail.

Japanese Patent Application Laid-Open No. 2005-100191 discloses a mobile communication terminal which is configured to, in a transmission process mode for an e-mail with which the image is attached, when an operation of a key, which is allocated in advance, is performed, start a camera function, and further, store the image data. The mobile communication terminal attaches the stored image data to an e-mail, and further, transmits the e-mail to a destination which is associated with the above-described key in advance.

SUMMARY OF INVENTION

However, although an apparatus described in each of the above-described Japanese Patent Application Laid-Open No. 2004-153453 and Japanese Patent Application Laid-Open No. 2004-289879 are capable of performing a start of an e-mail function and an attachment of the image data automatically in an imaging mode, with respect to a destination of the e-mail, user operations are needed. Therefore, for the apparatus disclosed in each of the above-described patent gazettes, there is a disadvantage in that operability is still insufficient.

According to the apparatus described in the above-described patent document 3, first, the user starts an e-mail transmission function, and then, starts a camera. When the user pushes a shutter key, the apparatus attaches the image data, which has been acquired through imaging and has been stored by the camera, to an e-mail, and further, transmits the e-mail. Accordingly, when an object the user desires to acquire the image thereof exists in front of the user, the user needs to go through a procedure of, first, starting the e-mail transmission function, and subsequently, starting the camera. Therefore, for the apparatus disclosed in the above-described patent gazette, there is a disadvantage in that operability is still insufficient.

The present invention has been made in view of the above-described disadvantage, and a main object thereof is to provide a communication apparatus, an e-mail creation method, an imaging method, a program storage medium and an imaging program storage medium which has achieved a further improvement in the operability required in transmitting an e-mail attached the image data.

Solution to Problem

A first communication apparatus according to an aspect of the present invention includes imaging means for imaging an object to acquire image data related to the object; storage means for storing registration information which is associated at least one predetermined action and at least one destination address; and control means for, in response to one of the predetermined action being performed during an operation of the imaging means, controlling the imaging means so that the storage means stores the image data acquired by the imaging means and creating an e-mail to which the destination address is set and with which the image data which is stored in the storage means is attached, the destination address being associated with the predetermined action and being stored in the registration information.

A first e-mail creation method according to another aspect of the present invention includes storing registration information which is associated at least one predetermined action and at least one destination address, into storage means; controlling, in response to one of the predetermined action being performed during an operation of imaging means for imaging an object to acquire image data related to the object, the imaging means so that the storage means stores the image data acquired by the imaging means and creating an e-mail to which the destination address is set and with which the image data which is stored in the storage means is attached, the destination address being associated with the predetermined action and being stored in the registration information.

A first imaging method according to another aspect of the present invention includes controlling, in response to an key which instructs to store the image data being pushed down during an operation of imaging means for imaging an object to acquire image data related to the object, the imaging means so that storage means stores the image data acquired by the imaging means and displaying the image data acquired by the imaging means while the key is pushed down.

In addition, the foregoing object can be also achieved by a computer program which enables a computer to realize the communication apparatus, the e-mail creation method and the imaging method including the individual components described above, as well as a storage medium which includes the computer program stored thereon, and which is readable by the computer.

Advantageous Effects of Invention

According to some aspects of the invention, an effect in which the operability required in transmitting an e-mail attached with the image data is further improved can be obtained.

BRIEF DESCRIPTION OF DRAWINGS

FIG. 9 is a diagram showing that specific key registration information includes pieces of image information in addition to pieces of key and destination address information.

FIG. 10 is a diagram showing that specific key registration information includes pieces of stamp image data in addition to pieces of key and destination address information.

DESCRIPTION OF EXEMPLARY EMBODIMENTS

First Exemplary Embodiment

Next, exemplary embodiments of the present invention will be described in detail with reference to the drawings. By way of examples, in each of which a communication apparatus according to the present invention is applied to a mobile communication terminal, the following exemplary embodiments will be described.

Figure 1:
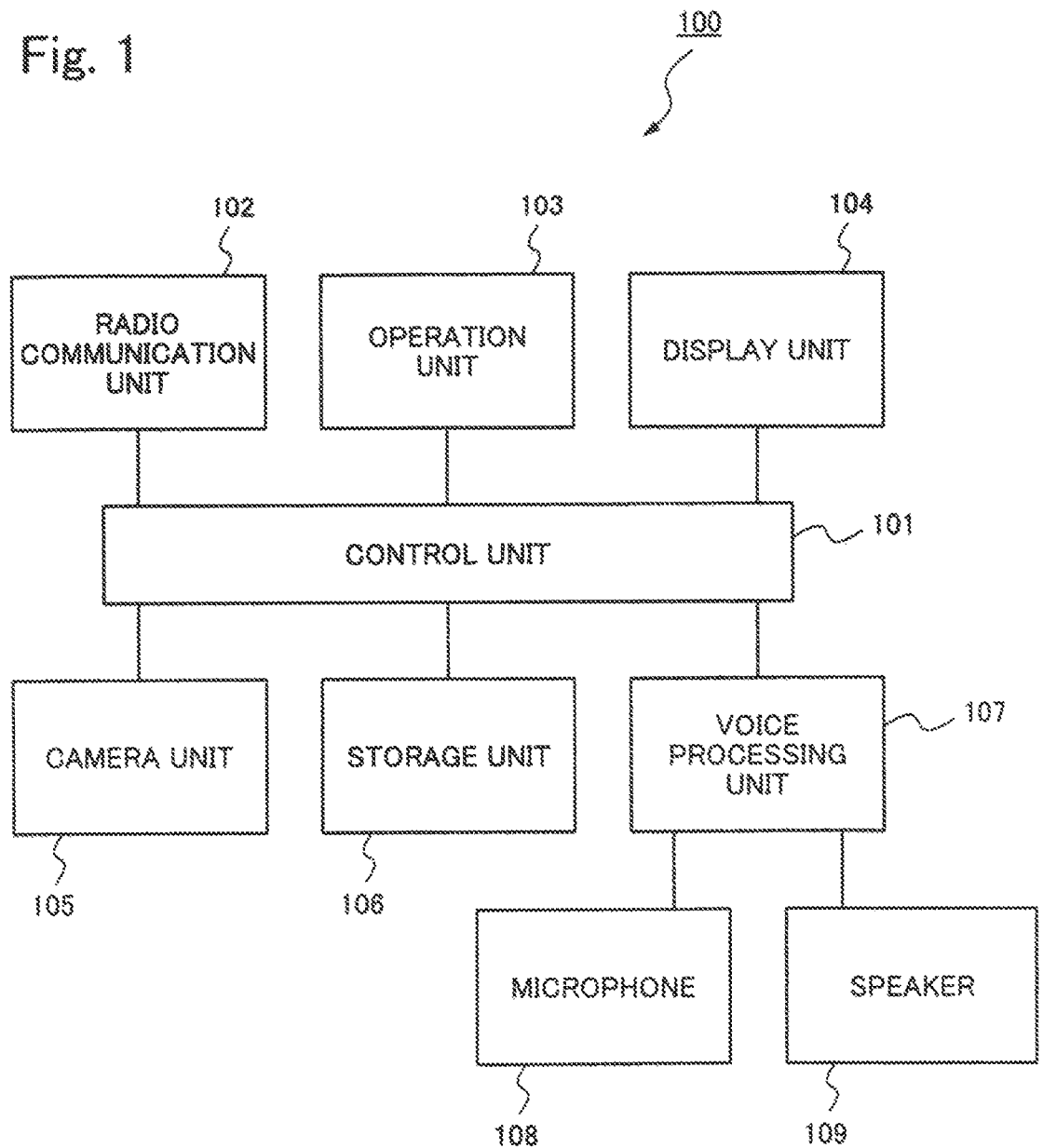
FIG. 1 is a block diagram showing a configuration of a mobile information terminal according to a first exemplary embodiment of the present invention.

FIG. 1 is a block diagram showing a configuration of a mobile communication terminal 100 according to a first exemplary embodiment of the present invention. As shown in FIG. 1, the mobile communication terminal 100 includes a control unit 101, a radio communication unit 102, an operation unit 103, a display unit 104, a camera unit 105, a storage unit 106, a voice processing unit 107, a microphone 108 and a speaker 109.

Figure 2:
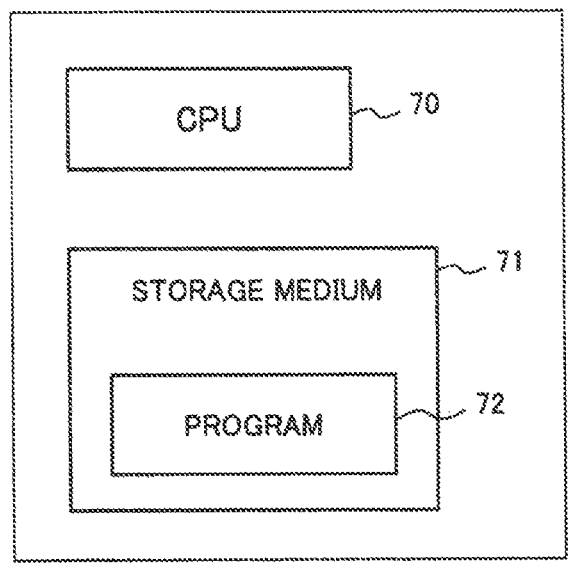
FIG. 2 is a diagram showing a hardware configuration of a mobile information terminal according to a first exemplary embodiment of the present invention.

The control unit 101 of the mobile communication terminal 100 shown in FIG. 1 has a hardware configuration exemplified in FIG. 2 in the case where it is realized by a computer. The configuration shown in FIG. 2 includes a central processing unit (CPU) 70, a storage medium 71, such as a memory, and a program 72 included in the storage medium 71. The CPU 70 of the mobile communication terminal 100 performs controls of the overall operation of the mobile communication terminal 100 by executing various software programs (computer programs). In this exemplary embodiment and other exemplary embodiments described below, the CPU 70 performs controls of operations performed by individual modules (individual units), described below, included in the mobile communication terminal 100, appropriately referring to the storage medium 71, such as a memory.

More specifically, the CPU 70 performs controls of operations performed by hardware elements, such as the radio communication unit 102, the operation unit 103 and the camera unit 105, by executing a software program which executes the functions of the control unit 101 included in the mobile communication terminal 100, appropriately referring to the storage medium 71, such as a memory.

The control unit 101 performs controls of individual units of the mobile communication terminal 100. The radio communication unit 102 transmits and receives information by radio to/from radio base station apparatuses (not illustrated) via an antenna. The operation unit 103 includes a numeric keypad, a direction key, a decision key, a side key and the like, and receives various information input from a user to the mobile communication terminal 100. The display unit 104 displays images, graphics, characters, symbols and the like. The camera unit 105 images an object to require image data related to the object. Here, the imaging means acquiring image data related to the object, and further, displaying the acquired image data on the display unit 104. The storage unit 106 stores therein telephone directory information, transmitting/receiving mail information, application program information, acquired image data, various setting information and the like. The voice processing unit 107 performs processing on voice signals having been input and output via the microphone 108, which is a telephone transmitter, and the speaker 109, which is a telephone receiver.

In response to one of the specific keys being pushed down by a user during an operation of the camera unit 105, the mobile information terminal 100 is capable of storing the image data which is acquired by the camera unit 105, that is, which is displayed on the display unit 104, into the storage unit 106, and further, creating an e-mail attached with the stored image data easily. The camera unit 105 stores the image data which is acquired thereby into the storage unit 106 if a decision key, a side key or the like is pushed other than the specific keys.

Here, the specific keys will be described. The specific keys are, for example, individual keys of a numeric keypad, and each of the specific keys instructs the control unit 101 to store the image data acquired by the camera unit 105, to create an e-mail, to attach the image data, and to set an e-mail address which is associated with the specific key. The specific keys are each associated with at least one intended e-mail address in advance.

Figure 3:
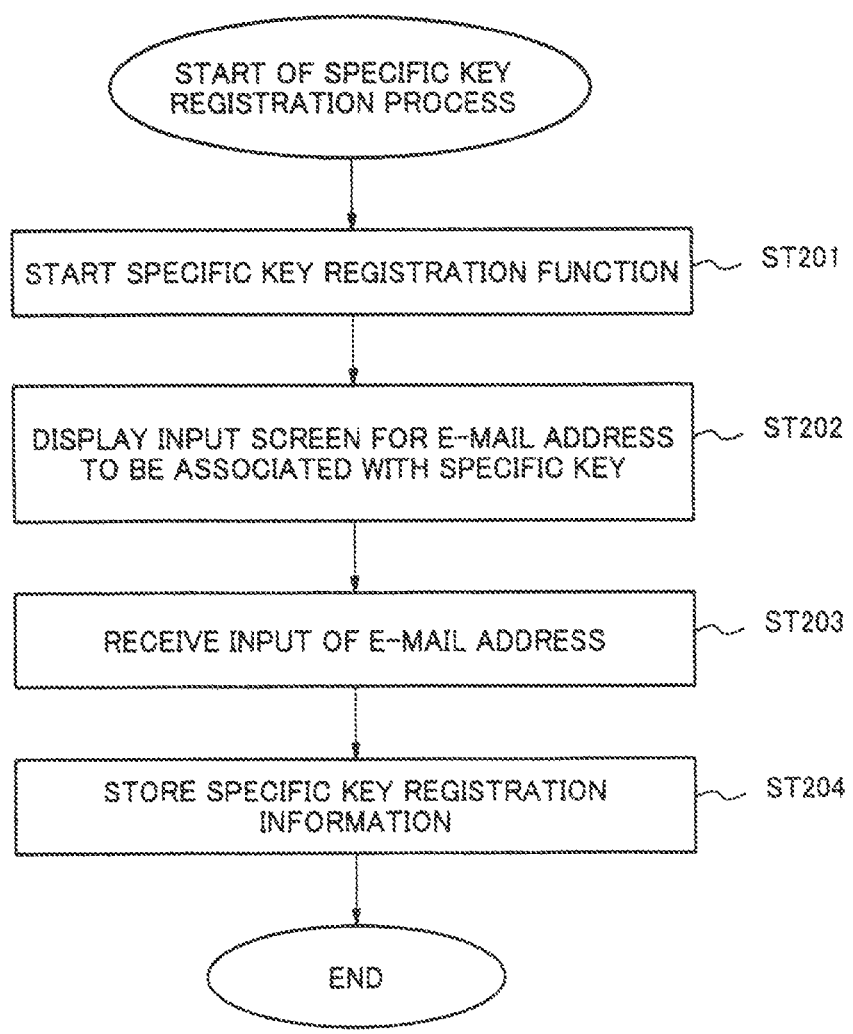
FIG. 3 is a flowchart showing operations of registering a specific key, performed by a user.
Figure 4:
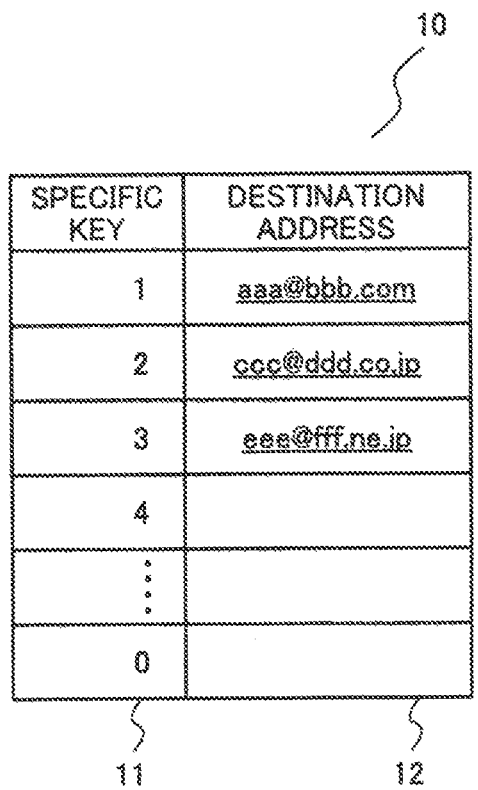
FIG. 4 is a diagram showing specific key registration information stored in a storage unit of a mobile information terminal according to a first exemplary embodiment of the present invention.

FIG. 3 is a flowchart showing operations for associating specific keys with e-mail addresses. FIG. 4 is a diagram showing association information of specific keys with e-mail addresses, that is, specific key registration information (registration information) 10 created by the user. The specific key registration information 10 includes specific keys 11 and destination addresses 12. Here, individual keys of the numeric keypad of the operation unit 103 are supposed to the specific keys. The association of specific keys with e-mail addresses will be described with reference to FIGS. 3 and 4.

The user starts a specific key registration function by operating the operation unit 103 (step ST201). The control unit 101 displays the individual keys of the keypad "1", "2" ... "0" on the display unit 104, and further, displays an input screen for inputting e-mail addresses to be associated with the individual keys (step ST202). The user inputs e-mail addresses the user desires to associate with the individual keys of the numeric keypad (step ST203). For example, "aaa@bbb.com" is input as an e-mail address to be associated with the key "1" of the keypad. At this time, the user may directly input e-mail addresses, or may select them from an address book.

The control unit 103 stores the specific key registration information 10, which associates the specific keys with the e-mail addresses, into the storage unit 106 (step ST204). By performing such operations as described above, the control unit 103 creates the specific key registration information 10, such as shown in FIG. 4.

Figure 5:
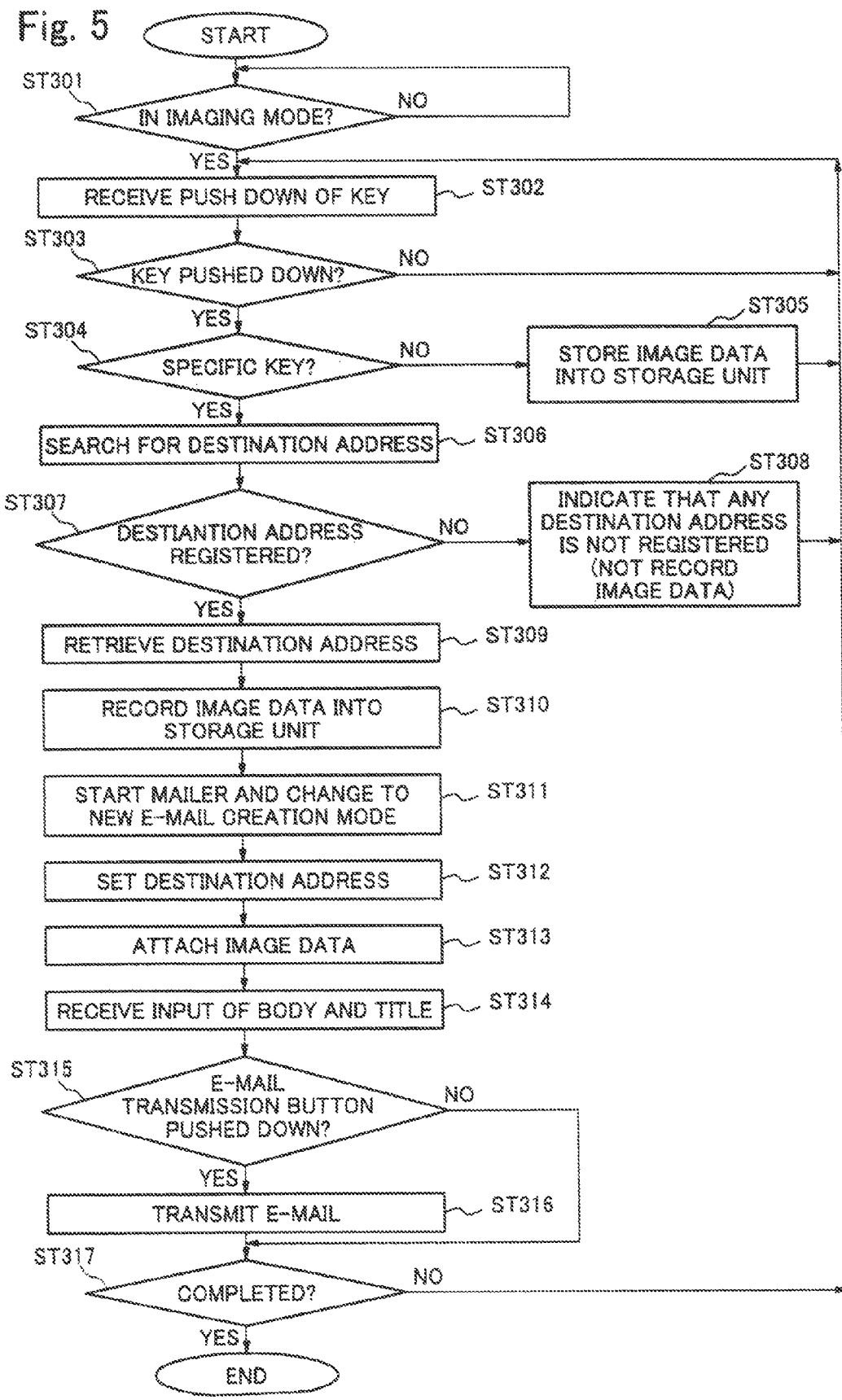
FIG. 5 is a flowchart showing operations of a control unit of a mobile information terminal according to a first exemplary embodiment of the present invention.

FIG. 5 is a flowchart showing operations of the mobile communication terminal 100. The operations will be described with reference to FIG. 5. Note that, here, the storage unit 106 stores therein the specific key registration information 10 shown in FIG. 4.

In response to input of an instruction for starting the camera unit 105 by user operation of the operation unit 103, the control unit 101 starts the camera unit 105. The control unit 101 determines whether the camera unit 105 is in an imaging mode or not (step ST302), in which the imaging mode the image data acquired by the camera unit 105 is displayed on the display unit 104, and if the camera unit 105 is in the imaging mode, receives an operation of pushing a key from the user. The user pushes one of photographing keys with watching the image data displayed on the display unit 104. Here, the photographing keys include the decision key or the side key, and the specific keys. The decision key or the side key has a function as the photographing key for instructing a usual photography. The specific keys each instructs to attach the stored image data through a photographing to the e-mail and to transmit thereof. In case where the user desires to perform the usual photography, the user pushes the decision key or the side key which has the function as the photographing key. In case where the user desires to attach the image data which is stored through the photography to the e-mail and transmit it, the user pushes one of the specific keys.

In response to detection of one of the photographing keys being pushed (step ST303), the control unit 101 determines whether the photographing key corresponds to any one of the specific keys, or not (step ST304). If the photographing key does not correspond to any one of the specific keys, that is, if the photographing key corresponds to the decision key or the side key, the push of the key indicates an instruction for execution of the usual photography. Therefore, in response to the photographing key being pushed down, the control unit 101 controls the camera unit 105 so that the storage unit 106 stores the image data acquired by the camera unit 105. In response to the instruction from the control unit 101, the camera unit 105 stores the image data acquired thereby into the storage unit 106 (step ST305). Subsequently, the control unit 101 returns the process to step ST302.

In contrast, if the pushed photographing key in step ST304 corresponds to any one of the specific keys, the control unit 101 identifies the key, and further, searches the specific key registration information 10 stored in the storage unit 106 in order to determine whether any destination address associated with the key is registered, or not (step ST306). If any destination address is not registered ("No" in step ST307), the control unit 101 indicates the fact on the display unit 104 (step ST308), and then, returns the process to step ST302. At this time, the camera unit 105 does not store the image data acquired thereby. In contrast, if any destination address associated with the above-described key is registered ("Yes" in step ST307), the control unit 101 retrieves the destination address (step ST309), and further, controls the camera unit 105 so that the storage unit 106 stores the image data acquired by the camera unit 105. In response to the instruction from the control unit 101, the camera unit 105 stores the acquired image data acquired thereby into the storage unit 106 (step ST310).

Further, the control unit 101 starts a mailer, and further, changes to a new e-mail creation mode (step ST311). The control unit 101 sets the destination address which is retrieved from the specific key registration information 10 as a destination of a new e-mail (step ST312). The control unit 101 attaches the image data which is stored in step ST310 to the mail (step ST313).

Subsequently, the user inputs a title and a body to the new e-mail to which the destination address is set and the image data is attached in such a way as described above (step ST314). Further, in response to a transmission button being pushed down by the user (step ST315), the control unit 101 transmits the e-mail (step ST316). In response to an instruction for terminating the imaging mode, the control unit 101 terminates the process. If not receiving the instruction, the control unit 101 returns the process to step ST302 (step ST317).

Owing to such operations described above, the user can perform storing the acquired image data, starting the new e-mail creation mode, attaching the image data, and setting the destination address, only by pushing one of the specific keys following starting the camera unit 105.

Here, the control unit 101 may have a destination-address registration reception function. That is, if, in step ST307, any destination address is not registered in the specific key registration information 10, the control unit 101 may indicate the fact on the display unit 104, and further, may change to a mode in which the registration of any destination address is prompted. In this mode, the user may directly input the e-mail address with which the user desires to associate the pushed specific key, or may select it from an address book. In response to an input of a destination address, the control unit 101 associates the destination address with the pushed specific key, and further, registers the destination address into the specific key registration information 10 in the storage unit 106. Moreover, the control unit 101 may indicate help information regarding the specific key registration function before changing to the mode in which the registration of destination addresses is prompted. In this way, the control unit 101 can indicate the specific key registration function to users who do not know that function.

The control unit 101 may have a preview function. That is, when the user pushes and holds the photographing key in step ST303, the control unit 101 may continue to display the image data which is stored by the camera unit 105 on the display unit 104 while the photographing key is pushed. When the user releases the photographing key, the control unit 101 may transfer to the process in step ST304. As described above, while the user pushes and holds one of the photographing keys, the control unit 101 continues such a preview, thereby making it unnecessary for the user to separately perform any reproduction operation for confirming the stored image data. Therefore, the ease of operations is further improved. At this time, if the user does not desire to store the image data, the control unit 101 may delete the image data in response to, for example, a clear button being pushed down by the user.

Further, as the specific keys, hardware keys, such as individual keys of the keypad, may be allocated in such a way as described above, or software keys may be allocated. For example, the display unit 104 may be constituted as a touch panel, and further, the control unit 101 may indicate numeric keys, which function as the specific keys, on the display unit 104. The user enables to photograph by touching one of the numeric keys with watching the image data displayed on the display unit 104. Further, the control unit 101 may display icons instead of the numeric keys. For example, the control unit 101 may also use pictures of transmission recipients as icons corresponding to the respective specific keys. In this case, even if the user does not remember numeric characters of respective numeric keys which the user registers so as to correspond to e-mail addresses of transmission recipients, the user can identify the e-mail addresses of transmission recipients at a glance. Further, in the case where the control unit 101 displays the software keys on the display unit 104 as the specific keys, when a folding-type or sliding-type mobile communication terminal is in a folded condition, the user thereof can push one of the specific keys without troubling to change it into a unfolded state. Accordingly, the ease of operations is further improved.

Further, the image data described above may be the still image data or the moving image data. In the case of the moving image, for example, in step ST303 of FIG. 5, the camera unit 105 may start a moving-image taking operation in response to one of the photographing keys being pushed down by the user, and may terminate the moving-image taking operation in response to a release of the photographing key by the user.

As described above, according to the first exemplary embodiment, the user perform associations of the destination addresses with the specific keys and registers them in advance, and the control unit 101 controls the camera unit 105 so that the storage unit 106 stores the image data acquired by the camera unit 105 in the imaging mode in response to one of the specific keys being pushed down. Moreover, in the imaging mode, in response to the specific key being pushed down, the control unit 101 starts a mailer, and further, changes to the new e-mail creation mode. Furthermore, the control unit 101 sets the destination addresses which are associated with the specific key as a destination of the new e-mail, and further, attaches the stored image data to the created e-mail. Owing to this configuration, only by pushing a key once in the imaging mode, the user can perform storing the image data, starting the new e-mail creation mode, setting the destination address, and attaching the image data, and thus, an effect in which the operability required in transmitting an e-mail attached with the image data is further improved can be obtained.

Second Exemplary Embodiment

In a second exemplary embodiment, a method in which the image data acquired by camera unit is stored in response to voice input will be described.

Figure 6:
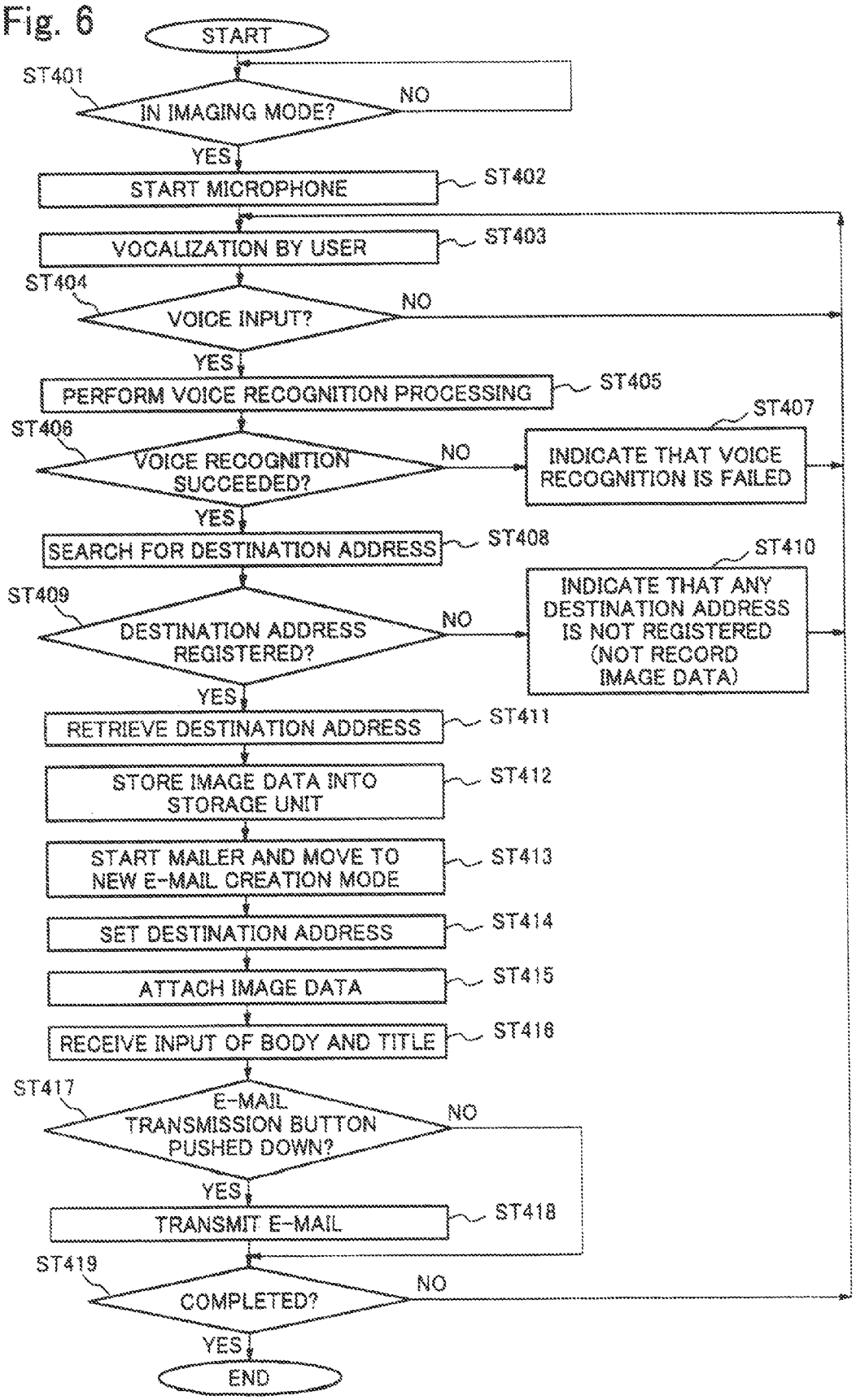
FIG. 6 is a flowchart showing operations of a control unit of a mobile information terminal according to a second exemplary embodiment of the present invention.

FIG. 6 is a flowchart showing operations performed by the mobile information terminal 100 according to the second exemplary embodiment. The operations will be described with reference to FIG. 6. Note that, in this embodiment, the storage unit 106 stores therein the specific key registration information 10 shown in FIG. 4.

In response to input an instruction for starting the camera unit 105 by a user operation of the operation unit 103, the control unit 101 starts the camera unit 105. The control unit 101 determines whether the camera unit 105 is in the imaging mode or not (step ST302), and if it is in the imaging mode, the control unit 101 starts the microphone 108 (step ST402). The image data which is being acquired by the camera unit 105 is displayed on the display unit 104. The user vocalizes a name representing one of the specific keys, such as "one" or "two" with watching the image data displayed on the display unit 104 (step ST403). In response to the voice being input, the microphone 108 notifies the voice processing unit 107 of the voice information (step ST404). The voice processing unit 107 recognizes the notified voice information, and further, notifies the control unit 101 of the result thereof (step ST405).

The control unit 101 determines whether the voice recognition is succeed or not and if not succeeded ("No" in step ST406), the control unit 101 displays the fact on the display unit 104 (step ST407), and then, returns the process to step ST403. If succeeded in the voice recognition ("Yes" in step ST406), the control unit 101 searches the specific key registration information 10 in the storage unit 106 and determines whether the destination address associated with the specific key which is indicated by the recognized voice is registered or not (step ST408). If the above-described destination address is not registered ("No" in step ST409), the control unit 101 displays the fact on the display unit 104 (step ST407), and then, returns the process to step ST403. Then, the camera unit 105 does not store the image data being acquired thereby. In contrast, if the above-described destination address is registered ("Yes" in step ST409), the control unit 101 retrieves the destination address (step ST411), and further, controls the camera unit 105 so that the storage unit 106 stores the image data acquired by the camera unit 105. In response to the instruction from the control unit 101, the camera unit 105 stores the image data acquired thereby into the storage unit 106 (step ST412).

Hereinafter, since operations in steps ST413 to ST419 are similar to those in steps ST311 to ST317 shown in FIG. 4 in the first exemplary embodiment, descriptions thereof will be omitted. As described above, by vocalizing the name one of the specific keys, the user can issue an instruction for storing the image data acquired by the camera unit 105, creating a new e-mail, attaching the stored image data, and setting an e-mail address associated with the specific key into the e-mail.

Here, in the specific key registration information 10 shown in FIG. 4, instead of allocating individual keys of a keypad such as "1" and "2" as the specific keys, the names of transmission recipients such as "farther" and "mother" may be allocated. In this case, since all the user requested to do is just to vocalize the name of the transmission recipient, the user can create a new e-mail to be transmitted to the recipient even if the user does not remember the specific key which is associated with the e-mail address of the transmission recipient. Therefore, in the mobile information terminal 100 according to the second exemplary embodiment, operability is improved further.

As described above, according to the second exemplary embodiment, the voice processing unit 107 recognizes the input voice and the control unit 101 sets the destination address associated with the specific keys which is indicated by the recognized voice into the new e-mail. Owing to this configuration, the user does not need to push any specific key, and thus, an effect in which the operability is further improved can be obtained.

Third Exemplary Embodiment

In a third exemplary embodiment, a modified example of the specific key registration information 10 having been described in the first exemplary embodiment, will be described.

Figure 7:
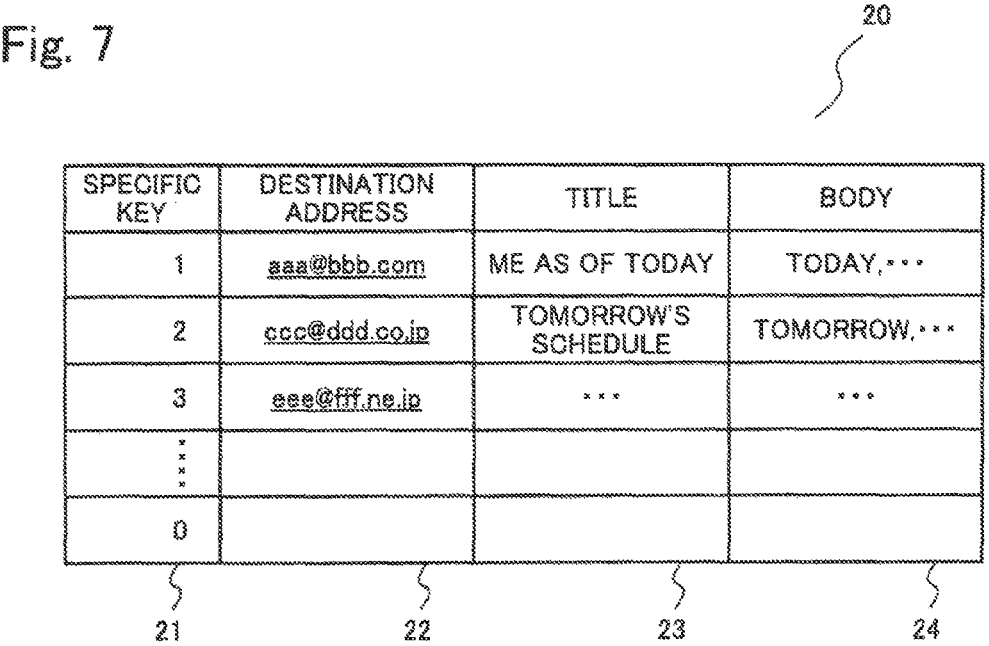
FIG. 7 is a diagram showing specific key registration information stored in a storage unit of a mobile information terminal according to a third exemplary embodiment of the present invention.

FIG. 7 is a diagram showing specific key registration information 20 stored in the storage unit 106 of the mobile information terminal 100 according to the third exemplary embodiment. As shown in FIG. 7, the specific key registration information 20 includes specific keys 21, destination addresses 22, titles 23 and bodies 24. The specific key 21 and the destination address 22 are similar to those having been described in the first exemplary embodiment. The title 23 indicates the content of a title which is automatically added to an e-mail to be transmitted to the corresponding destination address 22. The body 24 similarly indicates the content of a body.

In the case where the specific key registration information 20 shown in FIG. 7 is stored in the storage unit 106, the control unit 101 retrieves the title 23 and the body 24 in addition to the destination address 22 from the specific key registration information 20 in step ST309 of FIG. 5. The control unit 101 sets the title 23 and the body 24 into the new e-mail in addition to the retrieved destination address 22 in step ST312.

As described above, by allowing the user to perform registration of the title 23 and the body 24 in addition to the destination address 22 into the specific key registration information 20 in advance, the title and the body is also set into the new e-mail. Therefore, in the mobile terminal 100 according to the third exemplary embodiment, the ease of operations is improved further.

Figure 8:
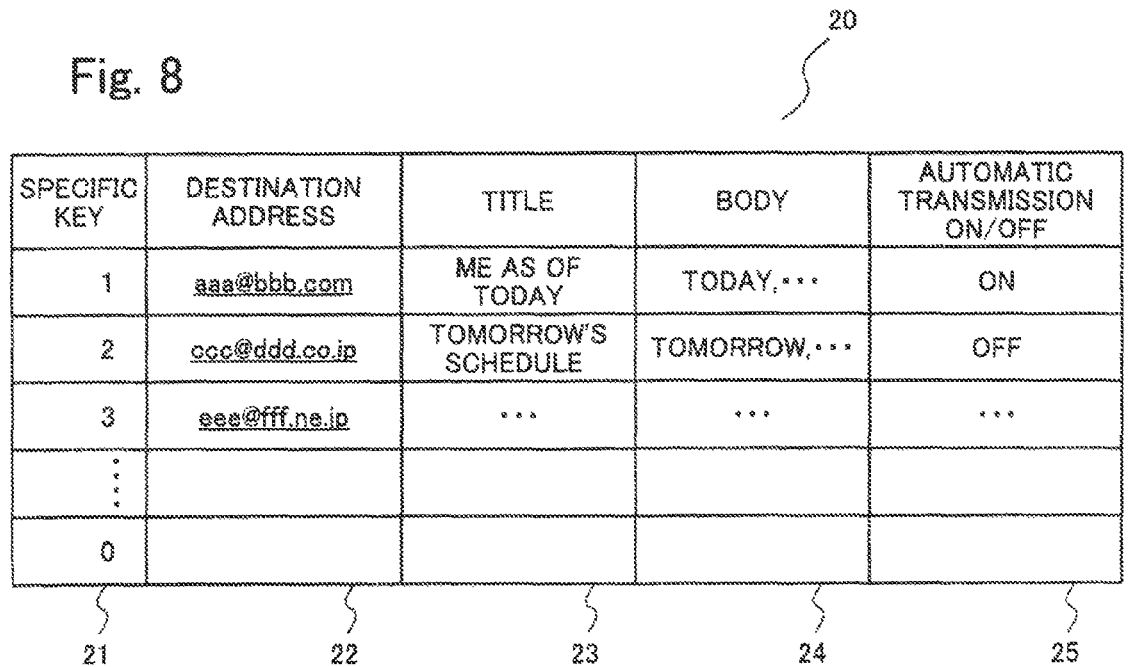
FIG. 8 is a diagram showing that specific key registration information includes pieces of automatic transmission on/off information in addition to pieces of key and destination address information.

FIG. 8 is a diagram showing a case in which the specific key registration information 20 shown in FIG. 7 further includes automatic transmission on/off setting 25. The automatic transmission on/off setting 25 is set to "ON" or "OFF". In the case where "ON" is set, in response to the specific key 21 being pushed, the e-mail is automatically transmitted to the corresponding destination address 22. In the case where "OFF" is set, the automatic transmission is not performed.

In the case where the specific key registration information 30 shown in FIG. 8 is stored in the storage unit 106, the control unit 101 retrieves the automatic transmission on/off setting 25 in addition to the destination address 22, the title 23 and the body 24 from the specific key registration information 20 in step ST309 of FIG. 5. In step ST312, the control unit 101 sets the title 23 and the body 24 into the new e-mail in addition to the retrieved destination address 22. In the case where the automatic transmission setting 25 is set to "ON", the control unit 101 performs e-mail transmission process of step ST316 without determining the presence or absence of the push of the e-mail transmission button in step ST315. In the case where the automatic transmission setting 25 is set to "OFF", the control unit 101 does not perform the automatic transmission, but performs operations similar to those of the first exemplary embodiment. As described above, by allowing the user to perform registration regarding whether the automatic transmission is to be performed or not in advance, an operation of pushing the transmission key is not needed, and thus, the ease of operations is improved further. Such a setting of the automatic transmission is particularly useful, for example, in case where the acquired image data is transmitted to a digital photo frame.

Plurality of sentences may be registered into any one of the bodies 24 of the specific key registration information 20. In case where the control unit 101 retrieves a plurality of sentences in the body 24 from the specific key registration information 20, the control unit 101 may set any one of them into the new e-mail at random, or may cyclically select any one of them to set into. Being registered a plurality of sentences as described above is particularly useful in case where, for example, the user frequently posts the image data to a blog. That is, the user can post the body which is selected from among a plurality of bodies at random, which is not the same body each time, together with the image data in posting the image data. Similarly, a plurality of titles may also be registered.

FIG. 9 is a diagram showing specific key registration information 30 including specific keys 21, destination addresses 22 and pieces of image information 31. The image information 31 each include, for example, a resolution 32 and a file size 33. A user sets the resolution 32 and the file size 33 in advance so that they are compatible with the display function of a receiving terminal of a corresponding transmission recipient.

In the case where the specific key registration information 30 shown in FIG. 9 is stored in the storage unit 106, the control unit 101 retrieves the image information 31 in addition to the destination address 22 from the specific key registration information 20 in step ST309 of FIG. 5. Then, in step ST313, after modifying the image data to be compatible with the retrieved image information 31, the control unit 10 attaches the modified image data to the new e-mail. In this way, the user can transmit the image data which is compatible with the display function of the receiving terminal of the transmission recipient.

FIG. 10 is a diagram showing specific key registration information 40 including the keys 21, the destination addresses 22 and pieces of stamp image data 41. As the stamp image data 41, a file name of arbitrary image data is allocated. For example, the image data for signatures may be allocated.

In the case where the specific key registration information 40 shown in FIG. 10 is stored in the storage unit 106, the control unit 101 retrieves the stamp image data 41 in addition to the destination Address 22 from the specific key registration information 20 in step ST309 of FIG. 5. The control unit 101, in step ST313, performs process (stamping process) for superimposing the retrieved stamp image data 41 on the stored image data, and then, attaches the image data resulting from the stamping process into a new e-mail. In this way, the user can perform stamping process to the stored image data using arbitrary image data.

In addition, any combination of the specific key registration information shown in FIGS. 7 to 10 may be used.

As described above, according to the third exemplary embodiment, since the control unit 101 automatically sets one of the pre-registered titles and bodies into the new e-mail, an effect in which the operability is further improved can be obtained. Further, since the control unit 101 controls a transmission on the basis of the automatic transmission on/off setting for the new e-mail, the user can automatically perform a transmission thereof without instructing the transmission, whereby an effect in which the operability is further improved can be obtained. Moreover, since the control unit 101 modifies the image data on the basis of the pre-registered resolution and file size regarding the image data to be attached to the new e-mail, an effect in which the user can transmit the image data in accordance with the display function of the receiving terminal of a transmission recipient can be obtained. Furthermore, since the control unit 101 performs stamping process to the image data which is stored by the camera unit 105 using arbitrary stamp image data which is registered in advance, an effect in which the user can transmit the image data which is performed the stamping process can be obtained.

Fourth Exemplary Embodiment

Figure 11:
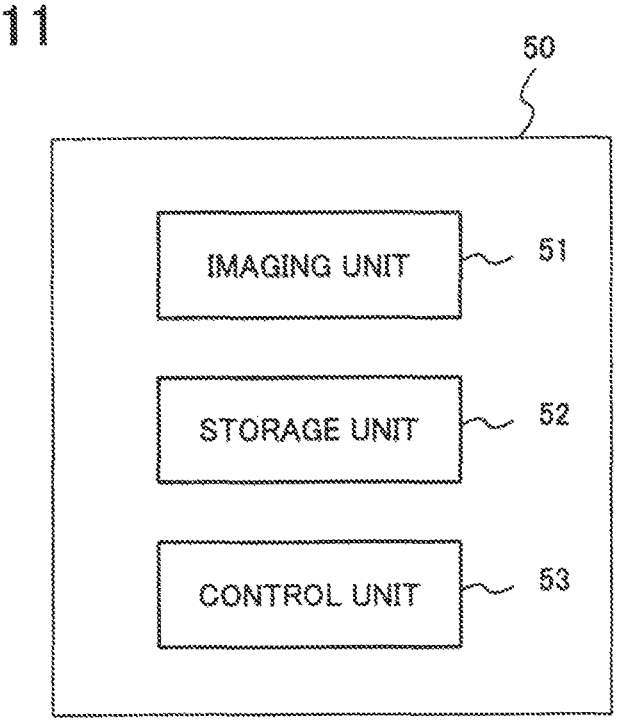
FIG. 11 is a block diagram showing a configuration of a mobile information terminal according to a fourth exemplary embodiment of the present invention.

FIG. 11 is a block diagram showing a configuration of a communication apparatus 50 according to a fourth exemplary embodiment of the present invention. As shown in FIG. 11, the communication apparatus 50 includes an imaging unit 51, a storage unit 52 and a control unit 53.

The imaging unit 51 images an object to acquire image data related to the object. The storage unit 52 stores registration information which is associated at least one predetermined action and at least one destination address. The control unit 53 controls, in response to one of the predetermined action being performed during an operation of the imaging unit 51, the imaging unit 51 so that the storage unit 52 stores the image data acquired by the imaging unit 51 and creates an e-mail to which the destination address is set and with which the image data which is stored in the storage unit 52 is attached, the destination address being associated with the predetermined action and being stored in the registration information.

The communication apparatus 50 corresponds to the mobile information terminal 100 according to any one of the above-described first to third exemplary embodiments. The imaging unit 51 similarly corresponds to the camera unit 105. The storage unit 52 corresponds to the storage unit 106. The control unit 53 similarly corresponds to the control unit 101.

As described above, according to the fourth exemplary embodiment, an effect in which the operability required in transmitting an e-mail attached the image data is further improved can be obtained.

In addition, the present invention having been described by using the above-described individual exemplary embodiments as examples thereof is realized by supplying the above-described mobile information terminal 100 with a computer program which can realize the functions shown by the flowcharts (shown in FIGS. 3, 5 and 6) having been referred to during the description thereof, and afterward, causing the CPU 70 of the relevant terminal to retrieve and execute the computer program.

Further, the computer program having been supplied into the terminal may be stored in a storage device (a storage medium), such as the memory 71 or a hard disk device which is readable and writable. Moreover, in such a case, the present invention is constituted by cords representing the computer program, or a storage medium for storing the computer program.

The present invention has been described with reference to the exemplary embodiments hereinbefore, but the present invention is not limited to the above-described exemplary embodiments. Various changes, which can be understood by those skilled in the art, can be made on the configuration and the details of the present invention within the scope of the present invention.

This application insists on the priority based on the Japanese application Japanese Patent Application No. 2009-285886 proposed on Dec. 17, 2009 and takes everything of the disclosure here.

INDUSTRIAL APPLICABILITY

The present invention can be applied to communication apparatuses, such as a mobile phone, a digital camera, a personal handy-phone system (PHS) and a personal digital assistant (PDA).

REFERENCE SIGNS LIST

100 mobile communication terminal
101 control unit
102 radio communication unit
103 operation unit
104 display unit
105 camera unit
106 storage unit
107 voice processing unit
108 microphone
109 speaker

The invention claimed is:

1. A communication apparatus, comprising:
    an imaging unit that images an object to acquire image data related to the object;
    a storage unit that stores registration information which is associated at least one predetermined action and at least one destination address; and
    a control unit that, in response to one of the predetermined action being performed during an operation of the imaging unit, controls the imaging unit so that the storage unit stores the image data acquired by the imaging unit and creates an e-mail to which the destination address is set and with which the image data which is stored in the storage unit is attached, the destination address being associated with the performed predetermined action and being stored in the registration information,
    wherein when any destination address is not associated with the performed predetermined action, the control unit controls the imaging unit so that the storage unit does not store the image data acquired by the imaging unit.

2. An e-mail creation method, comprising:
    storing registration information which is associated at least one predetermined action and at least one destination address, into a storage unit; and
    controlling, in response to one of the at least one predetermined action being performed during an operation of an imaging unit that images an object to acquire image data related to the object, the imaging unit so that the storage unit stores the image data acquired by the imaging unit and creating an e-mail to which the destination address is set and with which the image data which is stored in the storage unit is attached, the destination address being associated with the performed predetermined action and being stored in the registration information,
    wherein, in the controlling the imaging unit so that the storage unit stores the image data acquired by the imaging unit, in the case where any destination address is not associated with the performed predetermined action, controlling the imaging unit so that the storage unit does not store the image data acquired by the imaging unit.

3. A computer-readable program storage medium storing a program for causing a computer to perform:
- a process that stores registration information which is associated at least one predetermined action and at least one destination address into a storage unit;
- a process that controls, in response to one of the predetermined action being performed during an operation of an imaging unit that images an object to acquire image data related to the object, the imaging unit so that the storage unit stores the image data acquired by the imaging unit and creates an e-mail to which the destination address is set and with which the image data which is stored in the storage unit is attached, the destination address being associated with the performed predetermined action and being stored in the registration information; and
- in the process that controls the imaging unit so that the storage unit stores the image data acquired by the imaging unit, when any destination address is not associated with the performed predetermined action, a process that controls the imaging unit so that the storage unit does not store the image data acquired by the imaging unit.

* * * * *